Patented Aug. 18, 1953

2,649,384

UNITED STATES PATENT OFFICE 2,649,384

ASPHALT COMPOSITION AND PROCESS OF PREPARING THE SAME

Alvin P. Anderson, Woodcliff Lake, N. J., assignor to Shell Development Company, San Francisco, Calif., a corporation of Delaware No Drawing. Application May 15, 1950, Serial No. 162,151

9 Claims. (Cl. 106—270)

This invention relates to the manufacture of asphalt compositions especially suitable for roofing purposes and having improved temperature susceptibility and high ductility. Additionally, this invention is directed to the compositions possessing these properties.

It is well known in the art of manufacturing air-blown asphalts that such products, when prepared by the conventional method of air-blowing at elevated temperatures, should possess desirable characteristics such as low temperature susceptibility, high melting points for given penetrations, and moderately high ductilities. While it is possible to obtain by this method materials possessing desirably high melting points, certain disadvantages are inherent in the use of particular residua since certain properties (such as ductility) are often lower than commercial specifications.

The main identifying characteristics of roofing asphalt are penetration, melting point, ductility and temperature susceptibility.

The expression "temperature susceptibility" is used to describe the variation of penetration or viscosity of the asphalt with changes in temperature, at temperatures below or up to its softening point. It is sometimes expressed by the "susceptibility factor," defined as the ratio of the penetrations at two different temperatures. It may also be conveniently expressed in terms of a "penetration index," as described by Pfeiffer and Van Doormal in National Petroleum News, vol. 39, No. 8, pages R–78 to R–84 (February 23, 1938). The penetration index is based upon the relationship between penetration values (which may be determined at any desired temperature such as, for example, 59° F., 77° F., or 104° F., 77° F. being employed in the present specification), and the softening point by the ring and ball method. Relatively higher penetration indices indicate low-temperature susceptibility. On the basis of penetration index, asphalts have been grouped into three classes merging into one another, the boundaries of which have been chosen more or less arbitrarily: (1) The class with an index between −1 and +1, also known as the "N type." This class comprises most steam-refined bitumens (such as the Mexican) generally used for road making; these are sometimes called "normal bitumens"; (2) The class with an index below −1, sometimes known as the "Z type." This class is also sometimes indicated by the name "coal tar pitch type." Like the coal tar pitches, the bitumens of this type are characterized by their great temperature susceptibility and, in general, also by their great brittleness. (3) The class with an index above +1, also known as the "R type." Asphalts falling within this class have extremely low temperature susceptibilities, and, in addition, are generally characterized by a slight brittleness. As the majority of the blown bitumens have these characteristics, this type of bitumen is also sometimes known as the "blown type."

The modification of asphalt and asphalt blowing fluxes has been studied from a number of aspects. Numerous non-asphaltic petroleum fractions have been added to asphalt and fluxes to modify one or another of their well-known physical characteristics. The addition of lubricating oils having high or low viscosity indices, and the addition of various types of waxes, including normal paraffin waxes, wax tailings and microcrystalline waxes have been investigated. In most instances, the products so obtained were modified in one or another respect, improving their suitability for a particular use. However, it has been found that the addition of normal paraffin waxes results in blown asphalt compositions having poor ductility and poor adhesion to roofing granules or roofing felts. Wax tailings, according to Abraham, "Asphalts and Allied Substances," are decomposition products including chrysene, picene, and anthracene. While wax tailings improve the compatibility of asphalts with certain oils and tend to promote higher ductility, their use has been found to be detrimental with respect to temperature susceptibility. The addition of microcrystalline waxes to asphalts has been attempted, especially for roofing asphalts. The improvement in either ductility or penetration indices has not usually been satisfactory.

It is an object of the present invention to provide improved asphalt blowing fluxes. It is another object of the present invention to provide an improved process for the preparation of roofing-type asphalts. It is a particular object of the present invention to provide roofing-type asphalts having both enhanced penetration indices and high ductilities. Other objects will become apparent during the following discussion.

Now, in accordance with the present invention, it has been found that the penetration index and ductility of roofing-type asphalts are enhanced to a marked degree by the addition thereto of "soft wax," or of the major components thereof as more particularly described hereinafter. Still, in accordance with this invention, it has been found that the addition of "soft wax" to asphalt may occur either before or after a blowing operation, the resulting compositions obtained by these two alternative processes being substantially identical. It appears from this conclusion that the "soft wax," when present during the oxidation (i. e. airblowing) of asphalt, under the normal conditions for this air blowing of asphalt, is substantially unaffected. If any material change in the soft wax had occurred during a blowing operation, it would be expected that the two above alternative processes would result in materially different asphalt compositions.

The "soft wax" fraction especially suitable for use in the present compositions may be derived by composing the various ingredients detailed hereinafter, but is usually more economically derived by refinery fractionation processes. Illustrative of a typical process is the following: A waxy reduced crude is subjected to vacuum distillation to remove lubricating oil fractions and the majority of normal paraffin waxes, leaving a bottom fraction known as a "short residue." The short residue is subjected to propane deasphalting, resulting in the formation of deasphalted short residue. The latter is treated with a solvent, such as phenol, to remove the major portion of the aromatics, leaving a deasphalted waxy short residue containing small amounts of normal paraffins and aromatics and substantial amounts of "bright stock" oil and microcrystalline waxes. This mixture is subjected to cold (0 to —20° F.) solvent extraction with a solvent, such as methyl ethyl ketone, which dissolves a major proportion of the oil, leaving "short residue slack wax." The slack wax is again subjected to solvent extraction, this time at a higher (30-50° F.) temperature, dissolving "soft wax" and allowing the remaining higher melting point normal paraffins and higher melting microcrystalline waxes to crystallize.

The "soft wax" fraction is that fraction, when combined with asphalt, with which the present invention is especially concerned. The following analysis of this fraction gives the typical ranges of content of major components:

|                                    | Percent by weight |
| ---------------------------------- | ----------------- |
| Lubricating oil                    | 10-30             |
| Aromatics                          | 3-10              |
| Low melting microcrystalline waxes | 60-87             |

The aromatics (due to their melting points) appear to belong in the lubricating oil fraction, thus making the content of lubricating oil 13-40% and low melting microcrystalline waxes 60-87%.

The bright stock is preferably a lubricating oil fraction having a viscosity index of at least 30 and a viscosity of at least 100 seconds Saybolt Universal at 210° F.

The aromatics do not appear to be an especially significant fraction of the "soft wax." The most important ingredient is the mixture of low melting point microcrystalline waxes. These are, for the most part, highly branched and/or cyclic waxes characterized by having melting points between —18° C. and 40° C. It will be realized that no commercial fraction results in a sharply cut fraction. Therefore, it is presumed that inconsequential amounts of higher melting fractions (up to about 50° C.) are present.

The low melting microcrystalline waxes present in the "soft wax" fraction described above are to be differentiated from the high melting microcrystalline waxes. While the high melting microcrystalline waxes may improve the ductility and penetration index of asphalts to a limited degree, their effect is not as profound as that of the "soft wax" fraction described above. The example which follows will present data supporting this statement.

In the preparation of the "soft wax" fraction, various well-known alternative methods and conditions in wax isolation may be utilized. The "short residue" may be solvent-extracted with solvents other than propane to precipitate asphalt. Other suitable materials include ethane, butane, pentane, isobutane, isopentane, gasoline, naphtha, etc. Deasphalting ordinarily entails treatment of the short residue to precipitate asphalt and flashing of the solvent, e. g. propane, prior to aromatic extraction.

Aromatics are extracted by treating the deasphalted "short residue" with a solvent such as phenol, cresols, furfural, liquid sulfur dioxide, nitrobenzene, chloraniline, benzene-$SO_2$ mixtures, etc. The major amounts of aromatics are removed by this extraction, leaving, however, a small proportion in the wax.

At this stage the waxy "short residue" may comprise as much as equal amounts of bright stock and waxes. To remove the bright stock, the residue is treated at low temperatures with a selective solvent such as methyl ethyl ketone. Other solvents suitable in place of methyl ethyl ketone are methyl isobutyl ketone, propane and combinations of ketones with benzene and toluene. The low temperature extraction of waxy short residue is preferably conducted at temperatures between about —10° F. and —40° F. By this means, the major portion of the oil is removed leaving what is normally called "short residue slack wax" or "short residue crude wax."

In order to remove the last traces of oil and low melting waxes from the latter product, an additional treatment with an oil solvent such as methyl ethyl ketone is employed at a temperature somewhat higher than in the previous step. The portion which dissolves in the selective solvent at this point is called, for the purpose of the present discussion, "soft wax" fraction. As shown hereinbefore, this soft wax fraction contains a major amount of low melting point microcrystalline waxes, insignificant quantities of aromatics, and from about 10 to about 30% of lubricating oil. This step which is ordinarily called a "deoiling step" is preferably conducted at temperatures between about 20 and about 80° F. when using methyl ethyl ketone. For the purpose of the present invention, the subsequent disposal of the "short residue wax," which is the fraction of slack wax insoluble in the deoiling solvent, is immaterial. However, in order to clarify the examples which appear hereinafter, typical finishing steps of this insoluble fraction are given herewith. The short residue wax may be sent to a clay percolator mainly for the purpose of removing color, or it may be recrystallized and then further refined by acid or/and percolation. These materials are usually referred to as "plastic" or true microcrystalline wax useful especially in the production of laminated paper and the like.

The asphalts suitable for use in the present composition are those normally utilized as roofing asphalts which especially include both saturating and coating grades. The saturation grade is preferably obtained from the same blowing flux but is generally blown to a higher penetration than the coating grade. The fluxes utilized for air blowing to produce roofing-type asphalts are well known in the trade. It is preferred that the fluxes have high flash points (in the nature of 550° F. or higher) for safety purposes, low viscosity for ease in handling and that they be capable of rapid oxidation for economical operation of the blowing. Ordinarily, such fluxes have a softening point between about 70 and 120° F. by the ring and ball method. The fluxes may vary widely in their compositions and are usually determined by the nature of the various residua resulting from specific refining operation conditions and from the refining of specific types of crudes. It has been found, however, that with certain asphaltic crudes, vacuum flasher bottoms which are highly asphaltic in nature but yet fluid enough to be easily handled make satisfactory fluxes, while certain mixed crudes or crudes from West Texas and California do not make completely satisfactory fluxes.

The compositions of the present invention are prepared by combining from about 5% to about 20% by weight of the final composition of the above described "soft wax" fraction to either an asphalt blowing flux or to a blown asphalt. As intimated hereinbefore, the point of addition appears to be substantially immaterial since the compositions prepared by either method appear to be practically identical.

While the addition of the above described "soft wax" fraction is a preferred method of the invention, it will be realized that the individual components of said fraction may be added in the form of lubricating oil and of low melting microcrystalline wax, the two principal components of the "soft wax" fraction. Preferably, if such a process is employed, the lubricating oil is of high viscosity index and the soft microcrystalline waxes are those having melting points between about −18° C. and about 40° C. As mentioned hereinbefore, it is almost certain that any given fraction of either wax or oil will contain a minor amount of the fractions of materials from which they were supposedly separated. For example, in the low melting microcrystalline wax fraction described above, there may be some oil and also small amounts of higher melting microcrystalline waxes. Moreover, it will be realized that even though all short residue from which the "soft wax" was derived is preferably subjected to a solvent extraction for the removal of aromatics, the raffinate from such an operation will inevitably include residual amounts of aromatics. As long as the analysis of the product is substantially that given hereinbefore, the "soft wax" fraction is suitable for improving both the penetration index and the ductility of roofing-type asphalts.

If the individual components of the "soft wax" fraction are added to a blown asphalt or a blowing flux, the final composition should include 0–8% by weight of the composition of a lubricating oil and 3–17.5% of the low melting microcrystalline waxes. Preferably, the amount of lubricating oil is between 1 and 5% by weight of the final composition while the amount of low melting microcystalline waxes is between 5 and 15%. If the soft wax fraction, on the other hand, is added to a blown asphalt or a blowing flux, it is preferred that the amount thereof should be between 8 and 15% by weight of the final composition.

The conditions for the blowing of asphalt are well known and do not in themselves form a part of the present invention. While the conditions for air blowing may vary within considerable limits, the usual conditions include the maintenance of temperatures between 400 and 500° F. for a time which will usually vary between 8 and 24 hours. Temperatures of 425 to 475° F. for a period of 10–16 hours are usually optimum. In order to improve the penetration index of the blown asphalt or to shorten the time of air blowing, the addition of various catalysts has been found to be advantageous. Suitable catalysts include ferric chloride, ferrous chloride, phosphorus pentoxide, phosphoric acid, zinc sulfate, aluminum sulfate, aluminum chloride, boron trifluoride, lead oxide, lead naphthenate, sulfur and allied materials. For some reason as yet undetermined, it has been noted that the addition of soft wax to an asphalt blowing flux either before or during causes a marked reduction in the length of time required to produce an asphalt of roofing characteristics.

As noted thereinbefore, the primary purpose of the present invention is to produce blown asphalts having high penetration indices as well as high ductilities. The roofing industry requires ductilities not lower than about 2 cm. at 77° F. and preferably having a penetration between 17 and 22 at a softening point at 220° F. The data which follow show that the addition of soft wax to an asphalt blowing flux enables the production of blown asphalt meeting these requirements while neither the asphalt itself nor the addition of other types of waxes satisfies both the penetration index or the ductility requirements. The asphalt blowing flux used in the following experiments was a composite of 50% by weight of a West Texas crude residual asphalt having a softening point of 113 and 50% by weight of a heavy lube cut which is a semi-asphaltic oil from a low viscosity index lubricating oil fractionating column. Ten per cent by weight of various types of wax was added to this flux which was then blown at a temperature between 450 and 475° F. to the various softening points indicated.

*Properties after air blowing*

| Sample | Flux | Penetration at 77° F. | Softening [1] Point, °F. | Ductility [2] at 77° F. | Penetration Index, 220° F., Softening Point |
|---|---|---|---|---|---|
| A | 45% 113° F. softening point asphalt. 55% lube oil. | 11 | 222 | 0 | 3.8 |
| B | 45% 113° F. softening point asphalt. 45% lube oil. 10% short residue slack wax. | 18 | 218 | 1.5 | 4.8 |
| C | 45% 113° F. softening point asphalt. 45% lube oil. 10% short residue soft wax. | 20 | 220 | 2.5 | 5.0 |
| D | 45% 113° F. softening point asphalt. 45% lube oil. 10% 135° F. melting point microcrystalline wax. | 16 | 220 | 1.5 | 4.6 |
| E | 45% 113° F. softening point asphalt. 45% lube oil. 10% 180° F. melting point normal paraffin wax. | 14 | 223 | 1.0 | 4.4 |

[1] ASTM Method D36–26.
[2] ASTM Method D113–44.

From the above data it will be noted that

Sample A (the unmodified asphalt flux) had too low a penetration at 222° F. softening point to meet the ordinary roofer's specification, which usually includes a requirement that the roofing grade asphalt have a penetration between about 18 to 22 for an asphalt having a 220° F. softening point. Moreover, it will be found according to the table that Sample A was completely lacking in ductility whereas the roofer's specifications usually require a minimum ductility of 2.0. With respect to the remaining samples containing various waxes, it will be noted that only the slack wax and soft wax samples, namely, Samples B and C, are satisfactory with regard to penetration, while Samples D and E containing high melting point microcrystalline wax and high melting point normal paraffin wax were unsatisfactory in this respect. With regard to the ductility of roofing-grade asphalt it will be noted from the table that the only sample meeting the minimum requirement of the average roofer's specifications is Sample C which contains the soft wax of the present invention. Penetration index figures which are present in the table show that Sample C excels in this regard as well.

The reason for the improvement exhibited in Sample B over unmodified Sample A apparently is due to the use of slack wax which in turn contains soft wax as a minor portion thereof according to the description of wax fractionation contained hereinbefore. The use of ordinary microcrystalline wax, as shown by Sample D, while causing a certain improvement both in ductility and in penetration index, had considerably less effect than that exhibited for the composition of the present invention, namely, Sample C. The ductility figure shown for Sample E supports the previously known conclusion that normal paraffin wax, when added to asphalt, does little to improve the penetration thereof and also has little effect upon the ductility. It should be pointed out that a difference of 0.5 with regard to ductility is an important and even critical difference when roofing asphalts are being considered. With many crude stocks, as in the case of Sample A, roofing grade asphalts are very "short" and exhibit no ductility and hence, are unusable in roofing products.

The invention claimed is:

1. A roofing-type asphalt composition consisting essentially of a blown asphalt, the asphalt prior to being blown having a ring and ball softening point between 70° and 120° F., 1-5% by weight of said composition of a high viscosity index bright stock lubricating oil having a viscosity of at least 100 seconds Saybolt Universal at 210° F. obtainable from a waxy petroleum short residue and 5-15% by weight of said composition of microcrystalline wax-type hydrocarbons having melting points predominantly between about —18° C. and about 40° C.

2. An asphalt composition consisting essentially of a blown asphalt, the asphalt prior to being blown having a ring and ball softening point between 70° and 120° F., and 5-20% by weight of a "soft wax" fraction, said fraction comprising 13-40% by weight of bright stock lubricating oil having a viscosity of at least 100 seconds Saybolt Universal at 210° F. obtainable from a waxy petroleum short residue and 60-87% by weight of microcrystalline wax, said wax being comprised predominantly of microcrystalline wax-type hydrocarbons individually melting between about —18° C. and 40° C.

3. An asphalt blowing flux consisting essentially of an asphaltic residue having a ring and ball softening point between 70 and 120° F., 1-5% by weight of said flux of a high viscosity index bright stock lubricating oil having a viscosity of at least 100 seconds Saybolt Universal at 210° F. obtainable from a waxy petroleum short residue and 5-15% by weight of said flux of microcrystalline wax-type hydrocarbons having melting points predominantly between about —18° C. and about 40° C.

4. An asphalt blowing flux consisting essentially of an asphaltic residue having a ring and ball softening point between 70° and 120° F. and 8-15% by weight of said flux of a "soft wax" fraction, said fraction comprising 10-30% by weight of bright stock lubricating oil having a viscosity of at least 100 seconds Saybolt Universal at 210° F. obtainable from a waxy petroleum short residue, 3-10% by weight of aromatic hydrocarbons and 60-87% by weight of microcrystalline wax-type hydrocarbons melting predominantly between —18° C. and 40° C.

5. In the process for the preparation of a roofing-type asphaltic composition wherein an asphalt flux consisting essentially of an asphaltic residue having a ring and ball softening point between 70° and 120° F. is subjected to air-blowing, the improvement which comprises adding to said asphalt 5-20% of a "soft wax" fraction, said fraction consisting essentially of 13-40% by weight of bright stock lubricating oil having a viscosity of at least 100 seconds Saybolt Universal at 210° F. obtainable from a waxy petroleum short residue and 60-87% by weight of microcrystalline wax, said wax being comprised predominantly of microcrystalline wax-type hydrocarbons individually melting between about —18° C. and 40° C., said addition being made subsequent to air-blowing.

6. In the process for the preparation of a roofing-type asphaltic composition wherein an asphalt flux consisting essentially of an asphaltic residue having a ring and ball softening point between 70° and 120° F. is subjected to air-blowing, the improvement which comprises adding to said asphalt 5-20% of a "soft wax" fraction, said fraction consisting essentially of 13-40% by weight of bright stock lubricating oil having a viscosity of at least 100 seconds Saybolt Universal at 210° F. obtainable from a waxy petroleum short residue and 60-87% by weight of microcrystalline wax, said wax being comprised predominantly of microcrystalline wax-type hydrocarbons individually melting between about —18° C. and 40° C., said addition being made prior to air-blowing.

7. In the process for the preparation of a roofing-type asphalt, wherein an asphalt flux consisting essentially of an asphaltic residue having a ring and ball softening point between 70° and 120° F. is subjected to air-blowing, the improvement which comprises adding to said asphalt 5-20% of a "soft wax" fraction, said fraction consisting essentially of 13-40% by weight of bright stock lubricating oil having a viscosity of at least 100 seconds Saybolt Universal at 210° F. obtainable from a waxy petroleum short residue and 60-87% by weight of microcrystalline wax, said wax being comprised predominantly of microcrystalline wax-type hydrocarbons individually melting between about —18° C. and 40° C.

8. An asphalt blowing flux consisting essentially of an asphaltic residue having a ring and ball softening point of about 113° F. and about 10% by weight of said flux of a "soft wax" fraction, said fraction comprising 10-30% by weight of bright stock lubricating oil having a viscosity of at least 100 seconds Saybolt Universal at 210° F. obtainable from a waxy petroleum short residue, 3–10% by weight of aromatic hydrocarbons and 60–87% by weight of microcrystalline wax-type hydrocarbons melting predominantly between −18° C. and 40° C.

9. An asphalt blowing flux consisting essentially of an asphaltic residue having a ring and ball softening point between 70 and 120° F., and 5–20% by weight of said flux of a "soft wax" fraction, said fraction comprising 13–40% by weight of bright stock lubricating oil having a viscosity of at least 100 seconds Saybolt Universal at 210° F. obtainable from a waxy petroleum short residue and 60–87% by weight of microcrystalline wax, said wax being comprised predominately of microcrystalline wax-type hydrocarbons individually melting between −18° C. and 40° C.

ALVIN P. ANDERSON.

References Cited in the file of this patent

UNITED STATES PATENTS

| Number | Name | Date |
|---|---|---|
| 1,396,527 | Richter et al. | Nov. 8, 1921 |
| 2,291,905 | Koenig | Aug. 4, 1942 |

OTHER REFERENCES

"Commercial Waxes," Bennett, Chemical Publishing Co., Brooklyn, N. Y., 1944, page 60.

"Asphalts and Allied Substances," Abraham—Fifth Ed., vol. 1, D. N. Nostrand Co. Pub., 250 Fourth Ave., N. Y., pages 509, 510, 527 and 528.